United States Patent
Nam et al.

(10) Patent No.: US 8,379,065 B2
(45) Date of Patent: Feb. 19, 2013

(54) METHOD FOR DISPLAYING HIGH RESOLUTION PICTURE IN MOBILE COMMUNICATION TERMINAL, MOBILE COMMUNICATION TERMINAL AND SYSTEM FOR CONVERTING PICTURE FILE FORMAT THEREFOR

(75) Inventors: Gi-Seon Nam, Seoul (KR); Choong-Hwan Lee, Seongnam (KR); Hwang-Seok Oh, Seongnam (KR); Kyeong-Ryeol Park, Seongnam (KR); Jea-Woo Ahn, Seongnam (KR)

(73) Assignees: SK Planet Co., Ltd., Seoul (KR); Digital Aria Co., Ltd., Seongnam, Kyonggi-do (KR)

( * ) Notice: Subject to any disclaimer, the term of this patent is extended or adjusted under 35 U.S.C. 154(b) by 1163 days.

(21) Appl. No.: 10/564,178

(22) PCT Filed: Sep. 30, 2003

(86) PCT No.: PCT/KR03/01998
§ 371 (c)(1),
(2), (4) Date: Jun. 26, 2006

(87) PCT Pub. No.: WO2005/015910
PCT Pub. Date: Feb. 17, 2005

(65) Prior Publication Data
US 2007/0046698 A1    Mar. 1, 2007

(30) Foreign Application Priority Data
Aug. 7, 2003    (KR) .................. 10-2003-0054530

(51) Int. Cl.
*G09G 5/02* (2006.01)

(52) U.S. Cl. .................................. 345/698; 345/3.3
(58) Field of Classification Search .................. 345/698, 345/699, 3.3–3.4
See application file for complete search history.

(56) References Cited

U.S. PATENT DOCUMENTS
6,684,087 B1 *  1/2004  Yu et al. .................. 455/566
6,701,017 B1 *  3/2004  Nagata et al. ............ 382/232
(Continued)

FOREIGN PATENT DOCUMENTS
EP    1050846       11/2000
KR    100200637     7/1998
WO    WO02071380    9/2002

*Primary Examiner* — Michael Pervan
(74) *Attorney, Agent, or Firm* — Lowe Hauptman Ham & Berner, LLP

(57) ABSTRACT

The present invention discloses a method for displaying a high resolution picture in a mobile communication terminal having a low resolution display means, the mobile communication terminal and a system for converting a picture file format therefor. The method for displaying the high resolution picture in the mobile communication terminal includes the steps of: dividing picture data into a plurality of unit blocks, and converting the picture data into a picture file format including the plurality of unit block picture data and indexes for access to each of the block picture data; extracting minimum unit block picture data composing a partial picture which will be initially outputted to a display unit from the picture file by using the index information of the picture file format, and outputting the initial picture; and extracting the corresponding unit block picture data from the picture file in the movement direction by using the index information of the picture file format in accordance with generation of scroll action during the display of the picture, and outputting the position-moved picture.

34 Claims, 13 Drawing Sheets

U.S. PATENT DOCUMENTS

| | | | |
|---|---|---|---|
| 7,009,579 B1 * | 3/2006 | Kondo et al. | 345/1.2 |
| 7,233,807 B2 * | 6/2007 | Lim | 455/556.1 |
| 2002/0196970 A1 * | 12/2002 | Sano et al. | 382/166 |
| 2003/0117407 A1 * | 6/2003 | Minami | 345/555 |
| 2003/0220123 A1 * | 11/2003 | Motohashi | 455/550.1 |
| 2004/0061711 A1 * | 4/2004 | Kurumisawa et al. | 345/698 |

* cited by examiner

METHOD FOR DISPLAYING HIGH RESOLUTION PICTURE IN MOBILE COMMUNICATION TERMINAL, MOBILE COMMUNICATION TERMINAL AND SYSTEM FOR CONVERTING PICTURE FILE FORMAT THEREFOR

TECHNICAL FIELD

The present invention relates to a method for displaying a high resolution picture in a mobile communication terminal including a low resolution display means, and more particularly to, a method for rapidly displaying a picture in a mobile communication terminal by dividing the picture into blocks, compressing the divided block data and storing header information and indexes of each block in a compressed file, so as to display the picture at a high speed by using a small memory.

BACKGROUND ART

A conventional method for displaying a picture includes a method for decoding the whole compressed picture, storing the decoded picture in a large memory, copying data to be displayed to a frame memory, and outputting the data on a display screen, and a method for reading a file to be displayed by using a special compression algorithm, and displaying necessary data with the help from hardware.

The method for decoding the whole picture, storing the decoded picture in the large memory, copying the data in the corresponding position to a frame buffer by scrolling the display screen, and outputting the data to the display screen decodes compressed picture streams at a time and stores the decoded picture in the memory. Therefore, if the picture has high resolution, a large capacity of memory is needed. Accordingly, this method is not suitable for a portable terminal apparatus having small system resources.

For example, 4 Mbyte of memory is used to decompress and store a picture having the resolution of 1024 pixels in width and 2048 pixels in length in a terminal using display screen that supports 16 bit colors. In addition, when the compressed picture is decompressed and stored in the memory, an initial delay time increases.

The method for decoding and displaying specific data decodes and displays the data in the corresponding position, by scanning the whole compressed streams. Thus, this method can be used in a special compression algorithm.

For example, when the picture is compressed in block units like JPEG, the block data compressed streams in a decoding position are searched by scanning the whole file, and restored and displayed. It is dependent upon a method for compressing a picture. In the case that the method for compressing the picture maintains dependency of data, some compressed streams may not be restored. Moreover, the whole file must be scanned to compose one display screen, which requires a high speed hardware apparatus.

On the other hand, when the resolution of the picture is different from the resolution of the terminal for outputting the picture, the resolution of the picture must be converted in accordance with the resolution of the terminal. That is, when picture data are outputted to a terminal having a low resolution display means such as a mobile communication terminal, the picture is outputted with the resolution supportable by the terminal.

However, while the picture data are converted to have the low resolution, they are seriously damaged and lost, which reduces quality of picture.

DISCLOSURE OF INVENTION

The present invention is achieved to solve the above problems. Accordingly, it is an object of the present invention to provide a method for displaying a high resolution picture at a high speed in an apparatus having a low specification processor and a small memory such as a portable terminal through a wireless internet, a mobile communication terminal and a system for converting a picture file format therefor.

In order to achieve the above-described object of the invention, there is provided a mobile communication terminal for displaying a high resolution picture through a low resolution display unit, including a wireless transmitting/receiving unit for transmitting and receiving picture data through a mobile communication network, an input unit for receiving a command from the user, a display unit for outputting the picture, and a memory for storing the picture data, the mobile communication terminal including: a format converting unit for converting the picture data from the wireless transmitting/receiving unit into a picture file format including a plurality of unit block picture data and indexes for access to each of the block picture data, and storing the picture file format in the memory; and a picture data processing unit for extracting minimum unit block picture data composing a partial picture which will be outputted to the display unit from the picture file stored in the memory by scrolling by using the index information of the picture file format, and outputting the picture data.

According to another aspect of the invention, a system for converting a picture file format includes a format converting server connected to a mobile communication system and a picture providing server, for converting a format of the picture data from the picture providing server, the format converting server including: a received file database for storing the picture data from the mobile communication terminal or picture providing server, and a converted file database for converting the format of the picture data and storing the picture data; a picture data receiving unit for receiving the picture data from the mobile communication terminal or picture providing server; a picture dividing unit for dividing the picture of the picture data into a plurality of unit blocks; a storing unit for generating indexes of each unit block, generating a file converted into a picture file format including the picture data and indexes of each block, and storing the converted file in the converted file database; and a converted file transmitting unit for transmitting the converted file to the mobile communication terminal or picture providing server.

The present invention is intended to display a high resolution still picture in a small terminal such as a mobile communication terminal having a small display means. A high resolution picture is outputted in part, and then the whole picture is outputted by user scroll actions using an input mean such as a keypad or touch screen or automatic scroll actions.

BEST MODE FOR CARRYING OUT THE INVENTION

A method for displaying a high resolution picture in a mobile communication terminal, the mobile communication terminal and a system for converting a picture file format in accordance with preferred embodiments of the present invention will now be described in detail with reference to the accompanying drawings.

Figure 1:
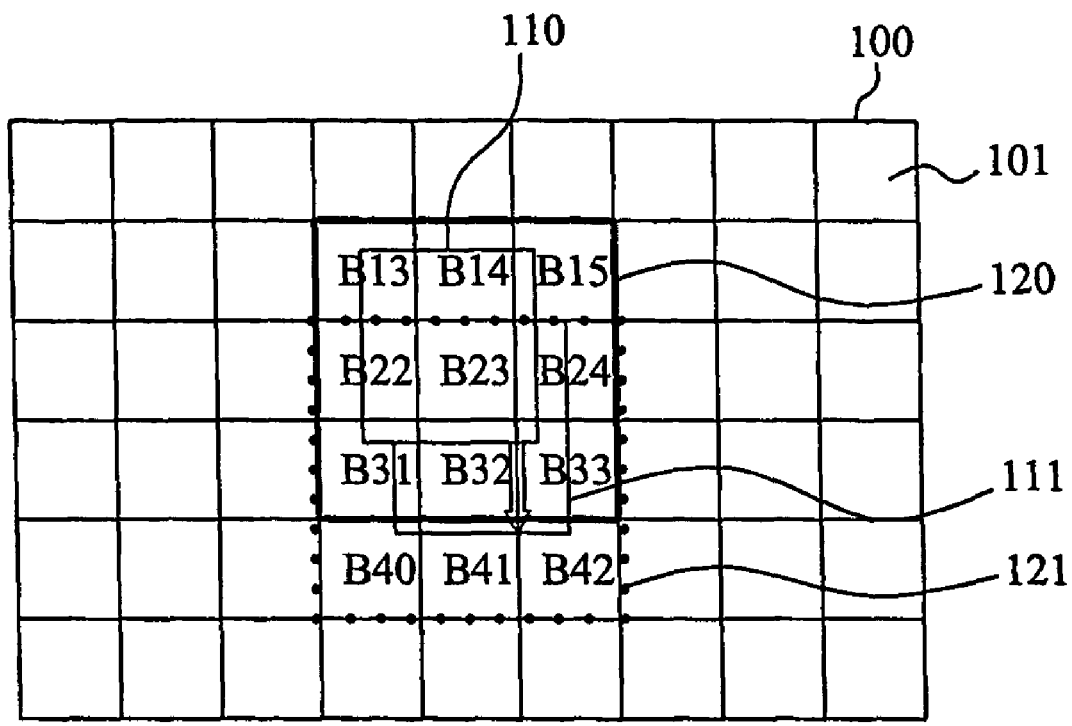
FIG. 1 is a concept diagram illustrating a method for displaying a high resolution picture in accordance with the present invention.
Figure 2:
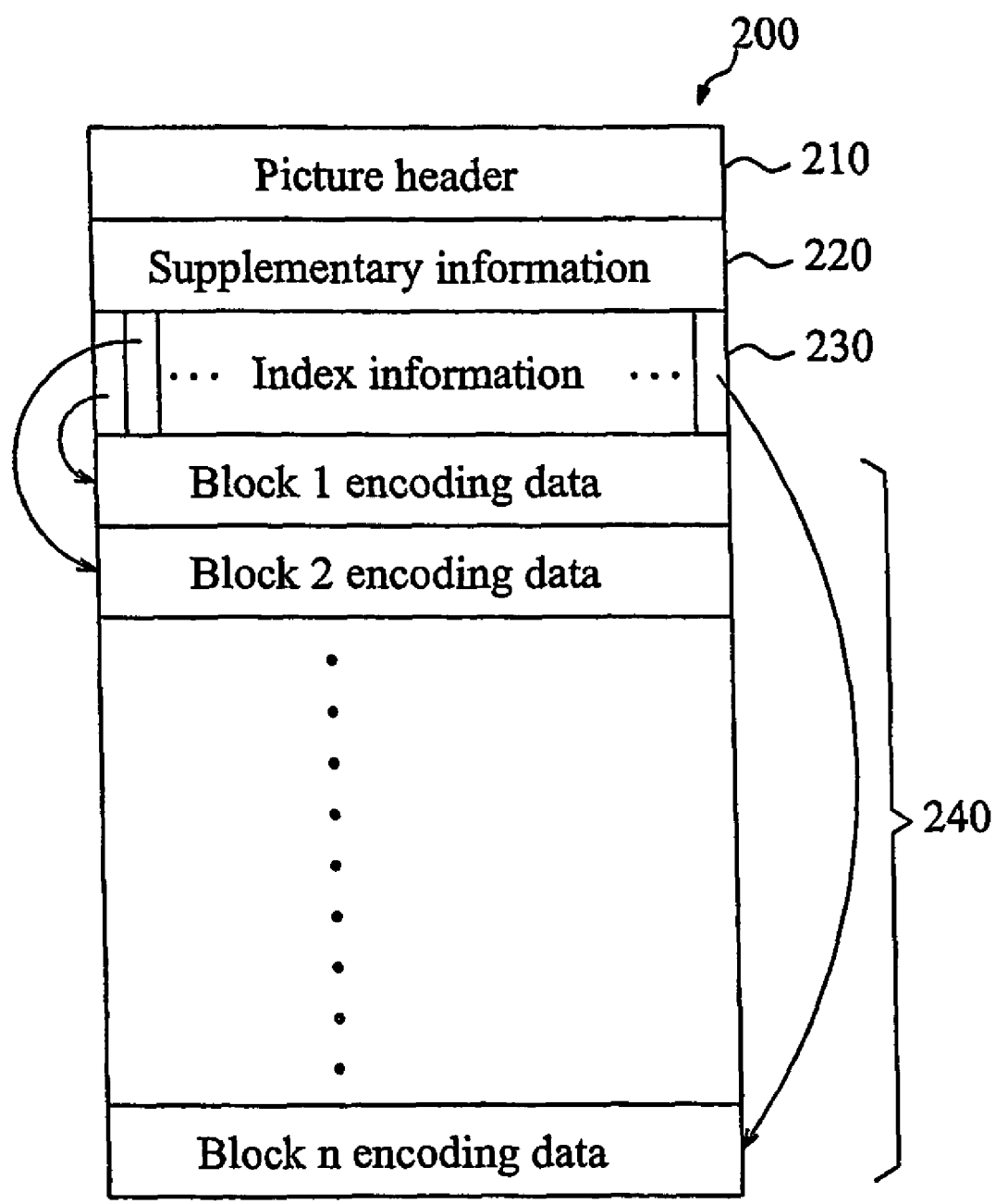
FIG. 2 is a structure diagram illustrating a picture file format in accordance with one embodiment of the present invention.

FIG. 1 is a concept diagram illustrating a method for displaying a picture in accordance with the present invention, and FIG. 2 is a structure diagram illustrating a picture file format in accordance with one embodiment of the present invention.

In order to embody the method for displaying the picture in accordance with the present invention, the whole picture 100 is divided into a plurality of unit blocks 101, the unit blocks 101 are individually compressed without being dependent upon each other, and the compressed data are stored according to a file format of FIG. 2. Here, a variety of methods for compressing a picture can be used.

In more detail, referring to FIG. 1, the whole picture 100 which will be displayed by scrolling is divided into the plurality of unit blocks 101, and each of the unit blocks 101 is provided with block numbers.

Screen frame buffers 110 and 111 are buffers for holding the data which will be outputted to a display unit of a mobile communication terminal, and decoding frame buffers 120 and 121 are buffers for holding the data decoded in block units, including buffering data of the screen frame buffers 110 and 111. Preferably, a size of the unit blocks 101 and a capacity of the decoding frame buffers 120 and 121 are decided according to the performance of the mobile communication terminal and an available amount of the memory.

Still referring to FIG. 1, the current screen frame buffer 110 including the picture data outputted to the screen includes block B23 and parts of blocks B13, B14, B15, B22, B24, B31, B32 and B33, and the current decoding frame buffer 120 includes blocks B13, B14, B15, B22, B23, B24, B31, B32 and B33. Accordingly, part of the data buffered in the decoding frame buffer 120 is copied to the screen frame buffer 110 and displayed.

Here, while the picture is being displayed in the mobile communication terminal, if a scroll action for moving the displayed picture is generated, the mobile communication terminal re-calculates the blocks which needs to be decoded and displayed, extracts the corresponding block data from the data stored memory, and decodes the block data, to correct the decoding frame buffer 120.

For example, when the current screen frame buffer 110 moves downwardly by the scroll range by scrolling the picture in the vertical direction, the corrected screen frame buffer 111 does not include blocks B13, B14 and B15 of the previous screen frame buffer 110, and newly includes parts of blocks B40, B41 and B42. As a result, the corrected decoding frame buffer 121 including the data which will be displayed on the screen exists partially outside the area of the current decoding frame buffer 120.

Accordingly, blocks B40, B41 and B42 are additionally decoded in the corrected decoding frame buffer 121, and the data corresponding to blocks B13, B14 and B15 of the current decoding frame buffer 120 are deleted. That is, the data decoded in the corrected decoding frame buffer 121 always include the data of the screen frame buffer 111. As described above, the decoding frame buffers 120 and 121 are corrected to decode minimum data required to be displayed on the screen, so that the high resolution picture can be displayed on the small screen at a high speed by automatic or manual scroll actions by using a small capacity of memory.

On the other hand, when the size of the picture 100 in width and length is not integer times as large as the size of each unit blocks 101, arbitrary blocks including residual parts obtained by dividing the picture 100 into the unit blocks 101 must be additionally compressed. To display the picture, the displayed part must be controlled to exist within the real picture range by using the size of the picture in width and length.

FIG. 2 is a concept diagram illustrating the format for storing the compressed picture data. The picture file format 200 is comprised of a picture header 210, supplementary information 220, index information 230 and block encoding data 240.

The picture header 210 includes information of the picture such as the size of the picture in width and length, the bit number per pixel and the size of each unit block.

The supplementary information 220 has various information for supplementary display, such as a thumbnail of the high resolution picture or location information of an initial display block in the terminal, and summary text information including explanations of the picture.

The index information 230 includes block location information for fast access to each block picture data of the file, and the encoding data 240 includes block picture data compressed and stored in block units.

A method for displaying a high resolution picture on a small display window by using the picture file format, a mobile communication terminal and a system for converting the picture file format will now be described in accordance with first and second embodiments of the present invention.

Figure 3:
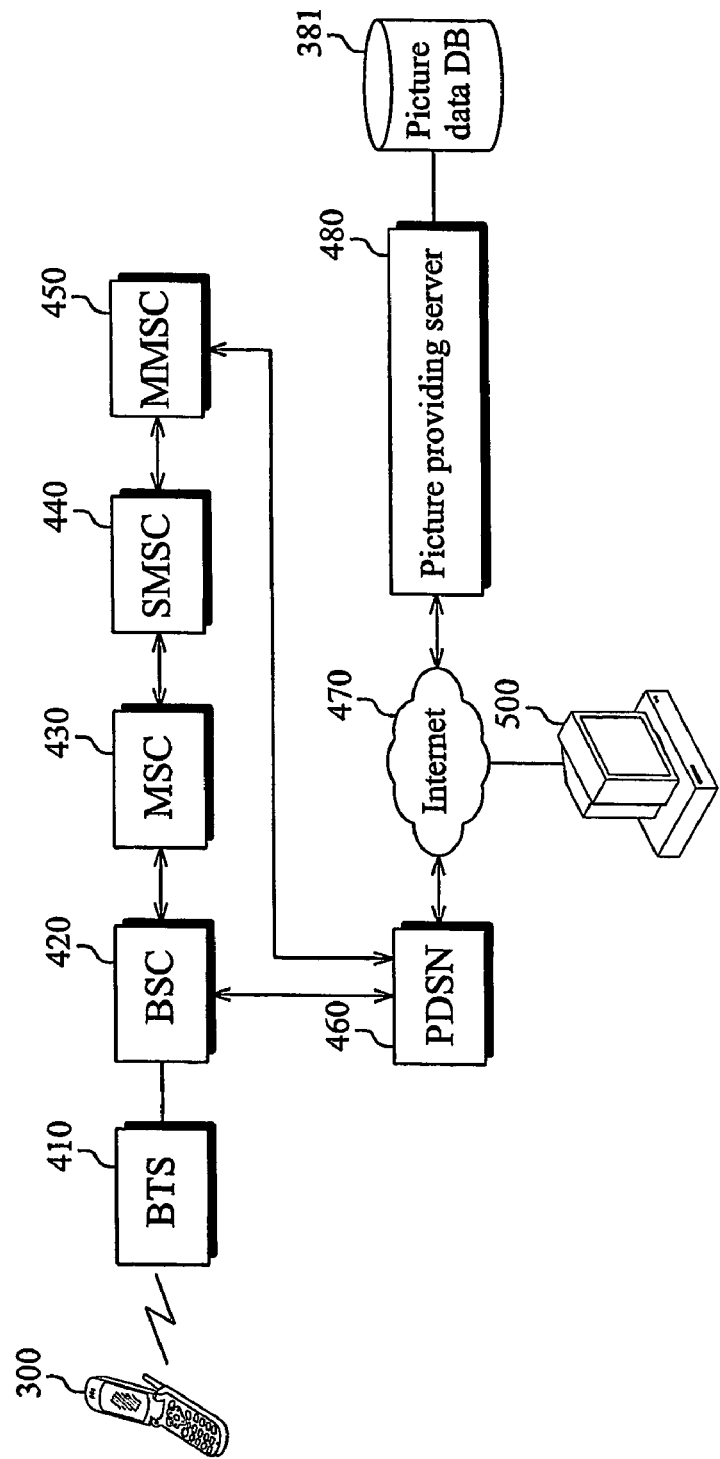
FIG. 3 is a structure diagram illustrating a mobile communication system in accordance with a first embodiment of the present invention.

FIG. 3 is a structure diagram illustrating a mobile communication system in accordance with the first embodiment of the present invention.

As illustrated in FIG. 3, the mobile communication system includes a base transceiver system (BTS) 410 for performing wireless area communication with a mobile communication terminal 300, a base station controller (BSC) 420 for controlling the BTS 410, a mobile switching center (MSC) 430 connected to the BSC 420 for switching calls, a short message service center (SMSC) 440, and a packet data service node (PDSN) 460 connected to a multimedia message service center (MMSC) 450 and an internet 470, for providing data services to the mobile communication terminal 300.

The mobile communication terminal 300 receives picture data from a picture providing server 480 including a picture data DB 481 and the MMSC 450 through the PDSN 460, and displays the received data, and the picture providing server 480 accesses the internet 470 through a computer terminal 500.

The mobile communication terminal 300 for receiving the picture data from the mobile communication system and displaying the received data will now be explained with reference to FIG. 4.

Figure 4:
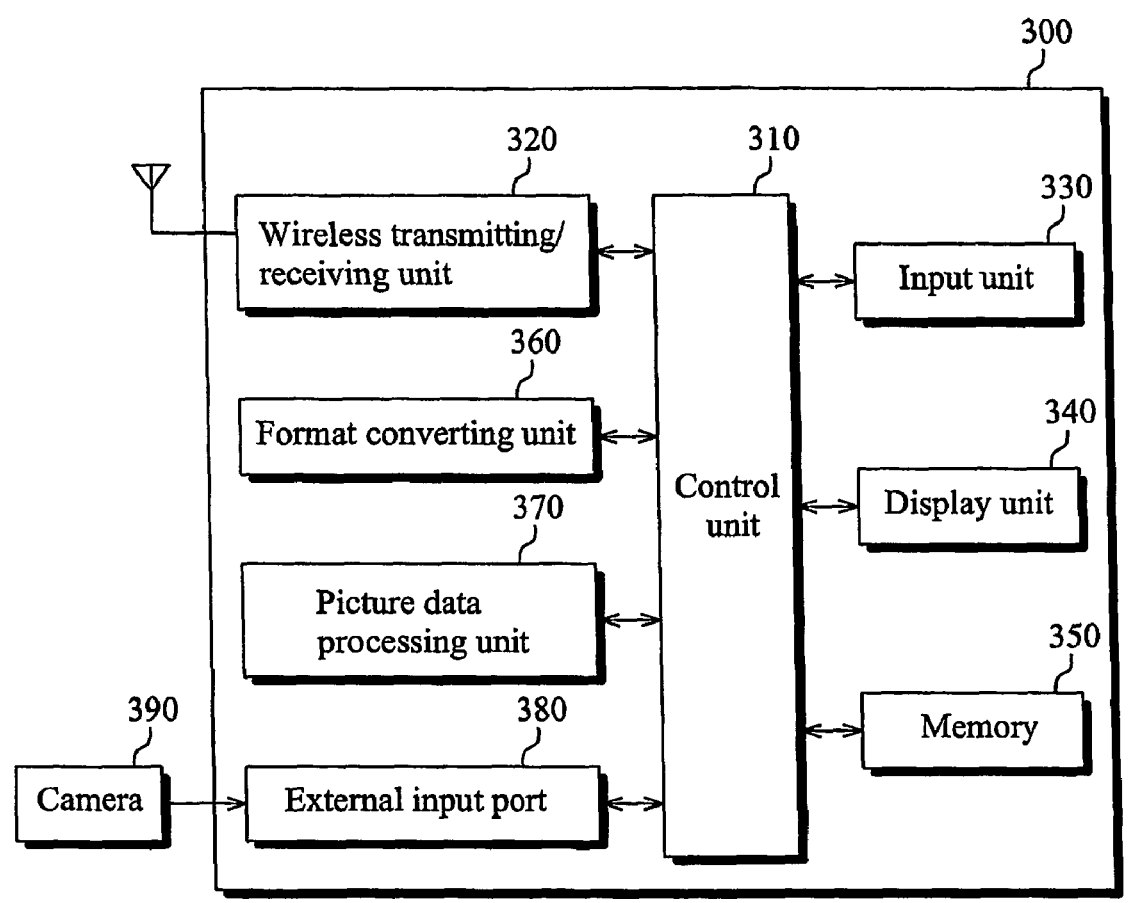
FIG. 4 is a structure diagram illustrating a mobile communication terminal of FIG. 3.

FIG. 4 is a structure diagram illustrating the mobile communication terminal of FIG. 3. The mobile communication terminal 300 converts the format of the picture data from the mobile communication system as shown in FIG. 2, and displays the format-converted picture file as shown in FIG. 1.

The mobile communication terminal 300 includes a control unit 310 for controlling the whole operations, a wireless transmitting/receiving unit 320 for receiving the picture data from the BTS 410, an input unit 330 for receiving a command from the user using a keypad or touch screen, a display unit 340 for displaying a picture or moving picture, and a memory 350 for storing the data.

The mobile communication terminal 300 further includes a format converting unit 360 for converting the format of the picture data from the wireless transmitting/receiving unit 320, and a picture data processing unit 370 for performing a series of processes for displaying the format-converted picture file.

Here, the mobile communication terminal 300 further includes an external input port 380 for receiving data from an external device such as a camera 390, so that it can receive the picture data photographed by the camera 390 through the external input port 380, convert a format of the picture data and display the picture data.

On the other hand, the format converting unit 360 divides the picture data from the wireless transmitting/receiving unit 320 or external input port 380 into a plurality of unit block picture data, compresses the unit block picture data, generates indexes of each block, and stores the indexes in the memory 350 with the unit block picture data, to convert the picture file format.

The picture data processing unit 370 extracts minimum unit blocks picture data composing the picture which will be outputted to the display unit 340 from the picture file format-converted and stored in the memory 350 by using the index information of the picture file format, and outputs the unit block picture data through the display unit 340.

Here, the picture data processing unit 370 displays part of the high resolution picture. If a scroll action by the user using the input unit 330 or an automatic scroll action is generated during the display operation, the picture data processing unit 370 displays the picture by changing the partial display position in the whole picture.

The format converting unit 360 and the picture data processing unit 370 will now be described in more detail with reference to FIGS. 5 and 6.

Figure 5:
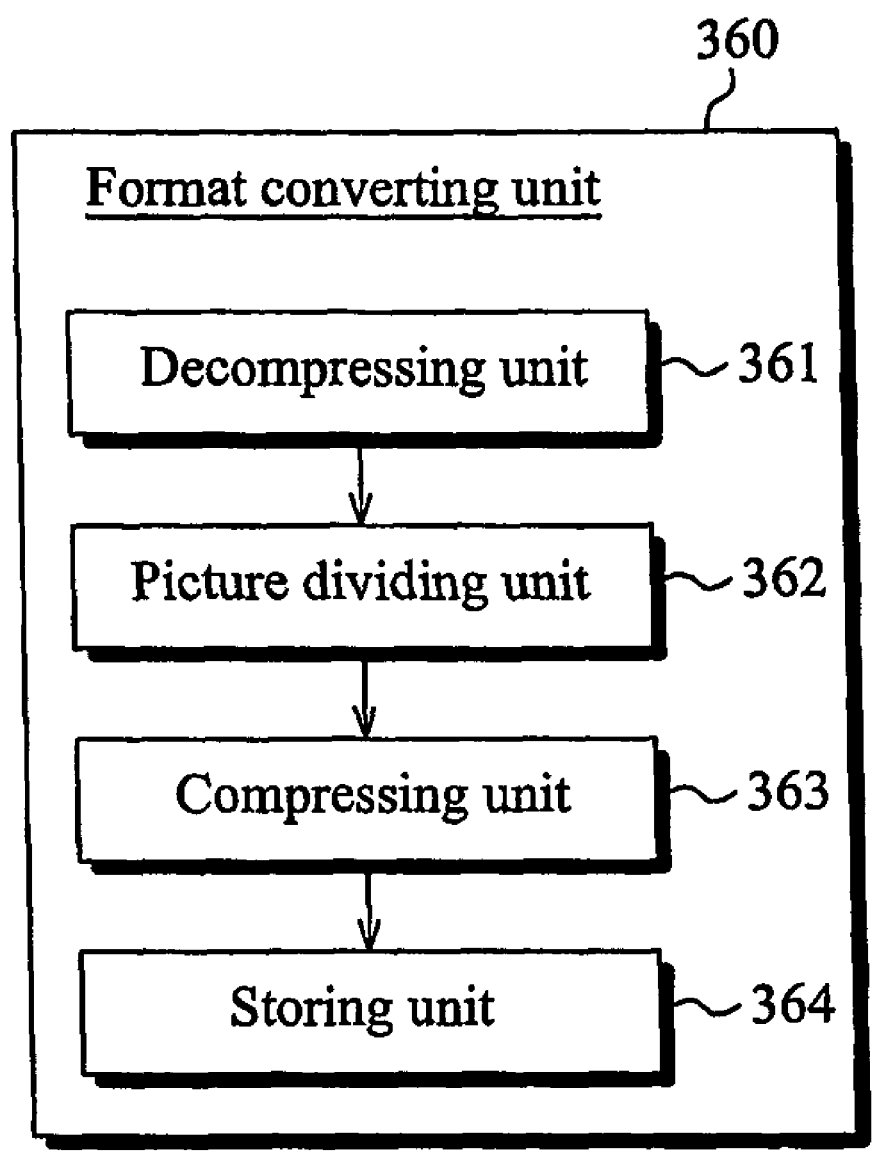
FIG. 5 is a structure diagram illustrating a format converting unit of FIG. 4.

FIG. 5 is a structure diagram illustrating the format converting unit 360 including a decompressing unit 361, a picture dividing unit 362, a compressing unit 363 and a storing unit 364.

The decompressing unit 361 decompresses the compressed picture data from the wireless transmitting/receiving unit 320 or external input port 380 to convert the format of the data.

The picture dividing unit 362 divides the original decompressed picture into a plurality of unit blocks. Here, the unit blocks are not restricted in size or shape, but changed according to the performance and supportable resolution of the terminal and a capacity of the memory. Each of the unit blocks needs not be always identical in size or shape.

The compressing unit 363 individually compresses the divided unit blocks by using a compression algorithm, not to be dependent upon each other. A variety of methods for compressing a picture can be used.

On the other hand, when the size of the picture in width and length is not integer times as large as the size of each of the unit blocks in width and length, the picture dividing unit 362 divides the picture into the unit blocks, and generates blocks including the last row and column which are residual parts, and the compressing unit 363 compresses the blocks, respectively.

The storing unit 364 stores the compressed unit block data in the memory 350, generates indexes of each unit block for fast access to the compressed unit block picture data by scroll actions, and stores the indexes with the compressed block picture data. In addition, the storing unit 364 preferably stores a picture header including the size of the whole picture and the size of each unit block, and supplementary information such as a thumbnail of the picture.

Figure 6:
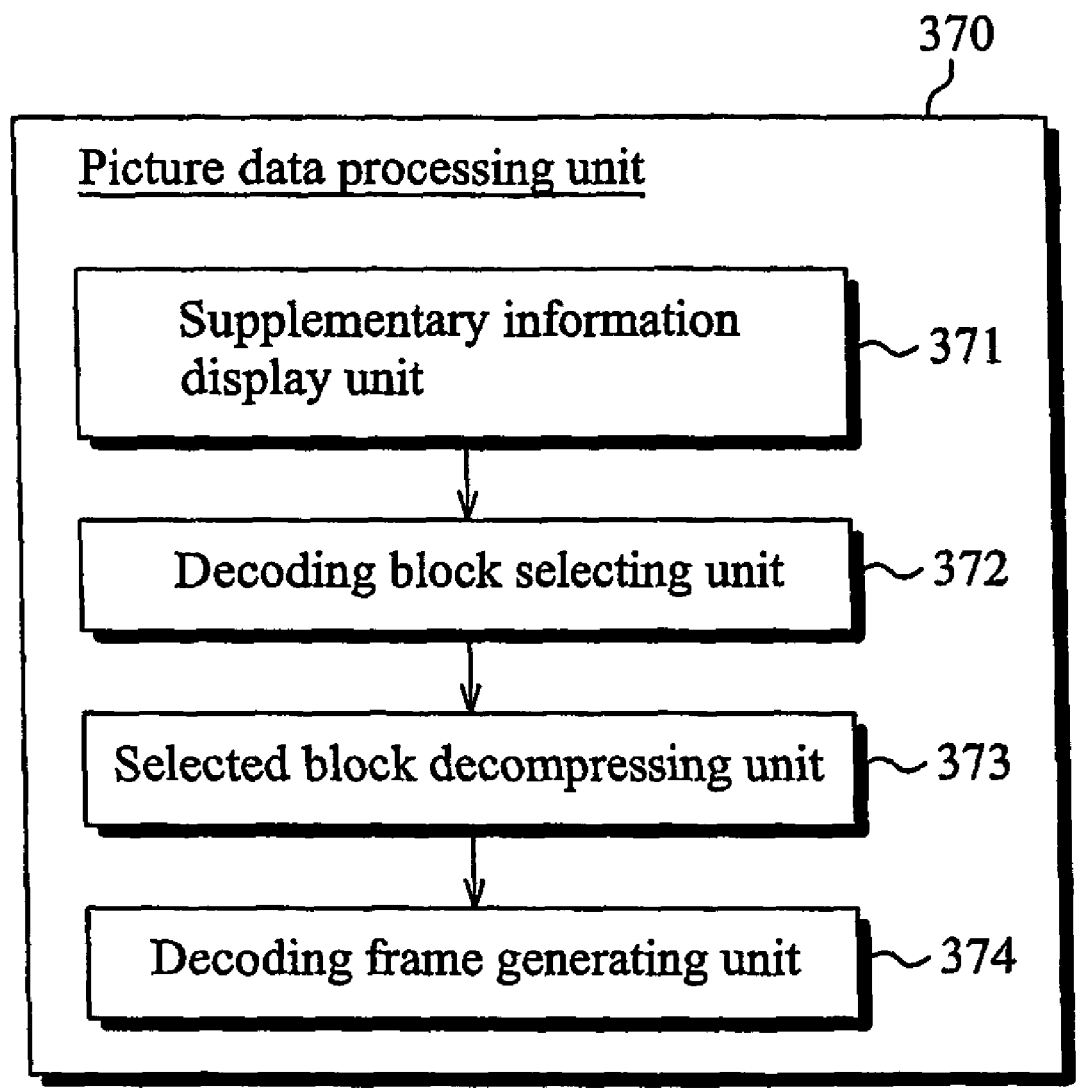
FIG. 6 is a structure diagram illustrating a picture data processing unit of FIG. 4.

FIG. 6 is a structure diagram illustrating the picture data processing unit 370 for displaying the format-converted picture data on the display unit 340 of the mobile communication terminal 300. The picture data processing unit 370 has a supplementary information display unit 371, a decoding block selecting unit 372, a selected block decompressing unit 373 and a decoding frame generating unit 374.

The supplementary information display unit 371 reads a supplementary information field of the converted picture file format, and displays the supplementary information field on the display unit 340. Here, the supplementary information display unit 371 displays the supplementary information on the whole display unit 340 before displaying the picture, or on the part of the display unit 340 when displaying the picture. Preferably, the thumbnail of the picture, the size of the whole picture and the location information of the initial display screen are displayed before the picture is displayed, and the summary text information of the picture is displayed on the part of the display unit 340 with the picture.

Thereafter, the decoding block selecting unit 372 selects minimum unit blocks composing the partial picture which will be outputted to the display unit 340, and extracts the selected unit block picture data from the picture file stored in the memory 350 by using the index information of the picture file format.

When the picture file stored in the memory 350 is a compressed file, the selected block decompressing unit 373 decompresses the extracted unit block picture data.

On the other hand, the memory 350 of the mobile communication terminal 300 includes the screen frame buffer 110 for buffering the picture outputted to the display unit 340, and the decoding frame buffer 120 for buffering each of the unit blocks including the picture outputted to the display unit 340.

The decoding frame generating unit 374 buffers the picture file of the extracted blocks in the decoding frame buffer 120, so that part of the data buffered in the decoding frame buffer 120 (data displayed on the screen) can be copied to the screen frame buffer 110 and outputted.

The operation of the mobile communication terminal 300 in accordance with the first embodiment of the present invention will now be explained with reference to FIG. 7.

Figure 7:
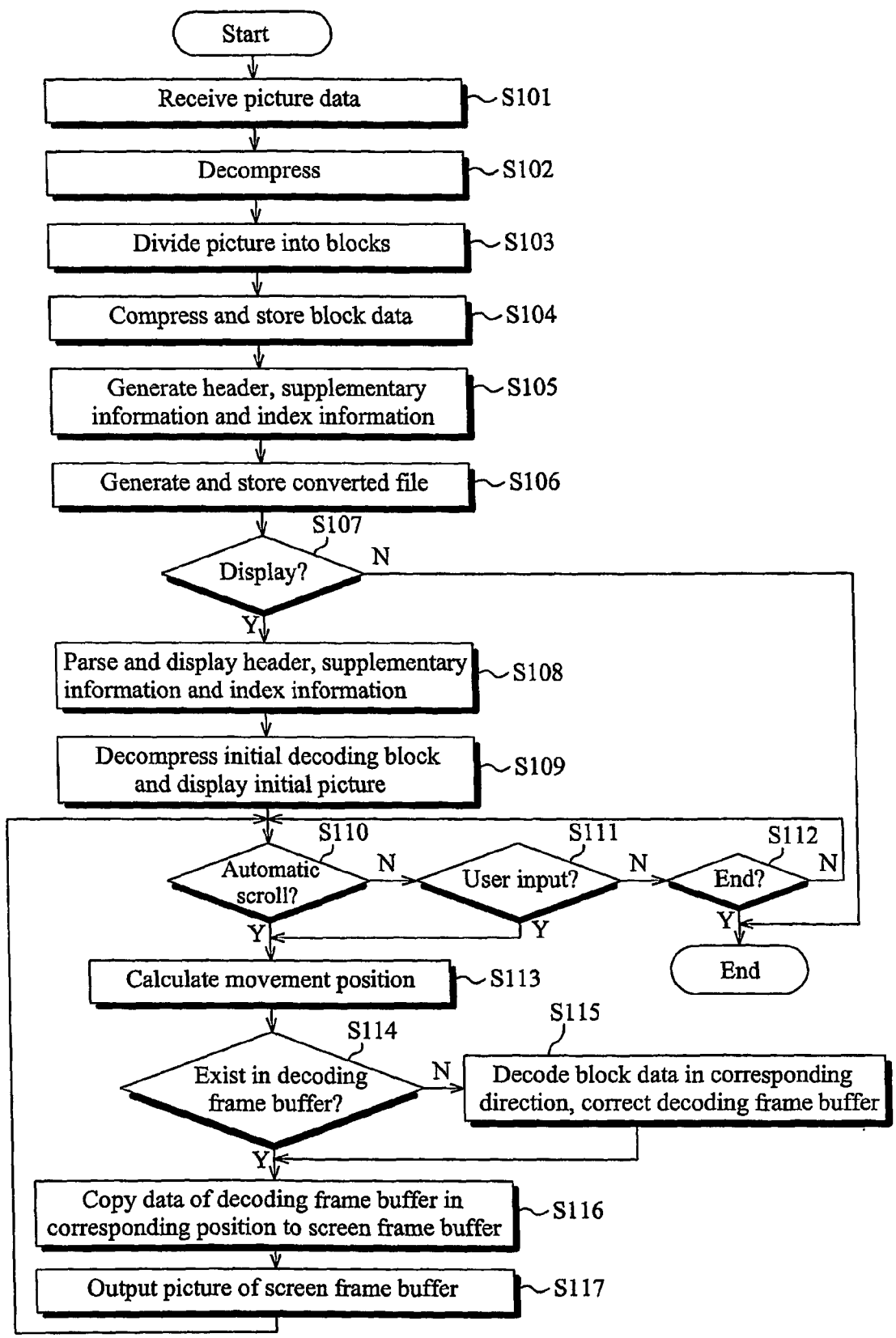
FIG. 7 is a flowchart showing sequential steps of a method for displaying a picture in a mobile communication terminal in accordance with the first embodiment of the present invention.

FIG. 7 is a flowchart showing a process for displaying a high resolution picture in the mobile communication terminal 300 in accordance with the first embodiment of the present invention. The process is divided into a format converting process S102~S106 of the format converting unit 360 and a display process S108~S117 of the picture data processing unit 370.

As shown in FIG. 7, when the mobile communication terminal 300 receives the compressed picture data from a picture providing apparatus such as the picture providing server 480 or camera 390 through the wireless transmitting/receiving unit 320 or external input port 380 (S101), the format converting unit 360 decompresses the picture data (S102). In the case that the mobile communication terminal 300 receives non-compressed picture data, the step for decompressing the picture data (S102) is omitted.

The format converting unit 360 divides the decompressed picture into a plurality of unit blocks (S103), and individually compresses and stores the plurality of unit block picture data (S104). Here, the step for compressing the picture data may be omitted according to a capacity of the data.

Thereafter, the format converting unit 360 generates indexes for fast access to the plurality of unit block picture data, a picture header and supplementary information (S105), generates a converted file including the unit block data according to the file format of FIG. 2, and stores the converted file in the memory 350 (S106).

The picture header may include the size of the whole picture and the size of each unit block, and the supplementary information may include the thumbnail of the picture, the location information of the initial display block, and the picture summary text information.

In the step for dividing the picture into the plurality of unit blocks (S103), if the size of the picture is not integer times as large as the size of each of the unit blocks, arbitrary blocks can be added.

On the other hand, when a display command for the format-converted picture data is generated in the mobile communication terminal (S107), the picture data processing unit 370 parses the picture header, supplementary information and index information, and displays the information on the display unit 340 (S108). In addition, the picture data processing unit 370 reads the picture data of the initial decoding block including the initial picture (part of the whole picture) which will be displayed on the display unit 340 by using the indexes of the file format, decompresses the picture data, buffers the decompressed data in the decoding frame buffer, and copies the data buffered in the decoding frame buffer to the screen frame buffer, to display the initial picture (S109).

Here, when the automatic scroll action is previously set (S110) or the scroll action is generated by the user using the keypad or touch screen (S111), the picture data processing unit 370 calculates movement and display positions of the screen in the whole picture by the scroll action (S113), and decides whether the position-changed picture data exist in the previous decoding frame buffer, namely whether the block which needs to be additionally decoded exists (S114).

As the decision result, when the block data in the movement position partially exist or do not exist in the previous decoding frame buffer (when the block which needs to be additionally decoded exists), the picture data processing unit 370 finds the corresponding block data in the movement direction, decodes the data, and stores the decoded data in the decoding frame buffer, to correct the decoding frame buffer (S115). Here, when the block which is not included in the moved screen frame buffer exists in the previous decoding frame buffer, the decoding data of the block must be deleted.

If the decoding frame buffer is corrected (S115) or the movement position exists in the previous decoding frame buffer, the picture data processing unit 370 copies the data of the decoding frame buffer in the position to the screen frame buffer (S116), and outputs the picture of the screen frame buffer, namely the moved picture through the display unit 340 (S117).

On the other hand, when the automatic scroll action is previously set (S110), if the user inputs command for intercepting the automatic scroll action through keypad, the display process in the movement position is ended (S112). When the display process is performed by the scroll action inputted by the user (S111), if the user stops inputting the scroll key, the display process in the movement position is ended (S112).

FIGS. 8 to 13 illustrate a system and method for converting a picture file format and displaying the picture in accordance with a second embodiment of the present invention, especially the system for converting the picture file format including a picture providing server for providing picture data, a format converting server for converting the format, and a mobile communication terminal for displaying the picture, and the method therefor.

Figure 8:
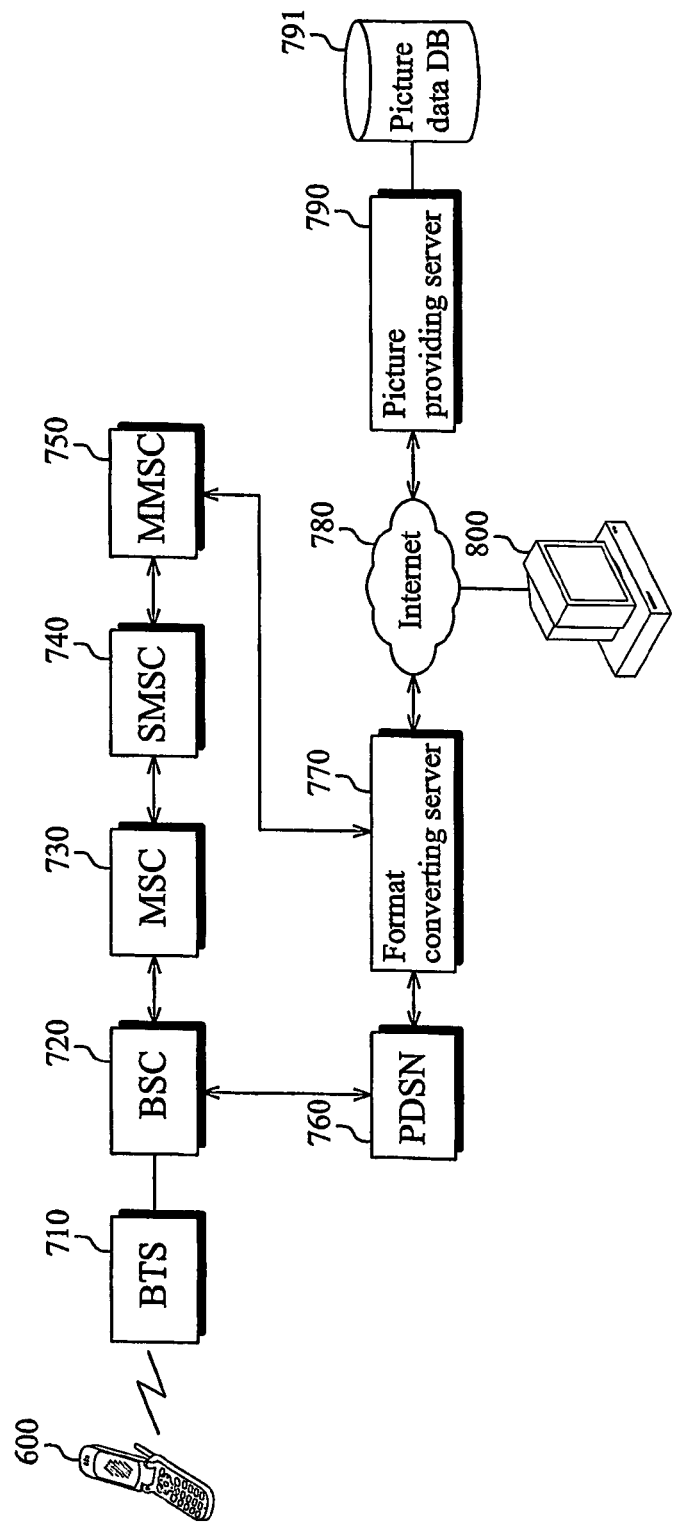
FIG. 8 is a structure diagram illustrating a system for converting a picture file format in accordance with a second embodiment of the present invention.

FIG. 8 is a structure diagram illustrating the system for converting the picture file format in accordance with the second embodiment of the present invention.

Referring to FIG. 8, the system for converting the picture file format includes a format converting server 770 connected to a picture data providing system such as an MMSC 750 and a PDSN 760 of a mobile communication system including a BTS 710 for performing wireless area communication with a mobile communication terminal 600, a BSC 720 for controlling the BTS 710, an MSC 730 connected to the BSC 720 for switching calls and an SMSC 740, the MMSC 750 and the PDSN 760 connected to an internet 780, for providing data services to the mobile communication terminal 600.

The mobile communication terminal 600 receives picture data from a picture providing server 790 including a picture data DB 791 and the MMSC 750 through the PDSN 760, and displays the received data, and the picture providing server 790 accesses the internet 780 through a computer terminal 800.

The format converting server 770 converts the format of the picture data from the picture providing server 790 or MMSC 750, and transmits the format-converted picture data to the mobile communication terminal 600. In addition, the format converting server 770 receives general picture data from the mobile communication terminal 600 or computer terminal 800, converts a format of the picture data, and re-transmits the picture data to the mobile communication terminal 600 or computer terminal 800.

The format converting server 770 will now be described in more detail with reference to FIG. 9.

Figure 9:
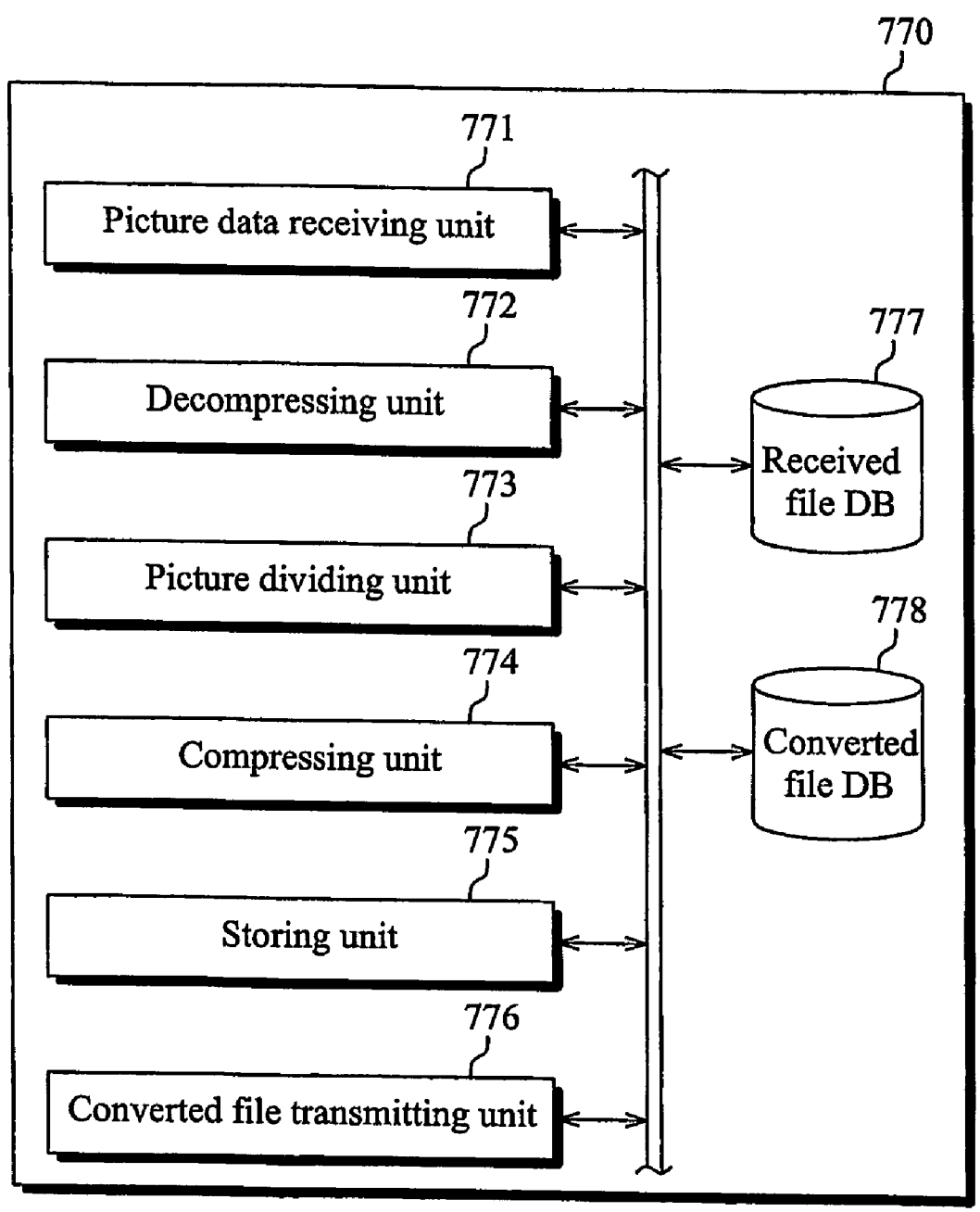
FIG. 9 is a structure diagram illustrating a format converting server of FIG. 8.

FIG. 9 is a structure diagram illustrating the format converting server of FIG. 8. As illustrated in FIG. 9, the format converting server includes a picture data receiving unit 771, a decompressing unit 772, a picture dividing unit 773, a compressing unit 774, a storing unit 775 and a converted file transmitting unit 776. The format converting server may include a received file DB 777 for storing general picture data, and a converted file DB 778 for storing the format-converted picture data.

The received file DB 777 stores picture data which are not converted into the file format of the invention, such as picture data transmitted from the mobile communication terminal 600 for format conversion, or picture data transmitted from the picture providing server 790 and the MMSC 750 for format conversion.

The converted file DB 778 stores the picture data obtained by dividing the picture data of the received file DB 777 into a plurality of blocks, compressing the picture data and converting the format of the picture data. In the format conversion, the size of each block can be decided according to the performance and supportable resolution of the terminal. Here, the format-converted picture data can be converted according to various specifications of terminals and stored in the converted file DB 778 to be provided to different terminals.

The constitutional elements for format conversion will now be explained in more detail.

The picture data receiving unit 771 receives picture data for format conversion from the mobile communication terminal 600 or picture providing server 790.

When the picture data from the mobile communication terminal 600 or picture providing server 790 are compressed data, the decompressing unit 772 decompresses the picture data.

The picture dividing unit 773 divides the received picture data or the received and decompressed picture data into a plurality of unit blocks. When the size of the picture is not integer times as large as the size of each the unit blocks, the picture dividing unit 773 can add arbitrary blocks to solve the problem.

The compressing unit 774 compresses each of the blocks, respectively. A variety of methods for compressing a picture can be used.

The storing unit 775 generates indexes of each unit block, generates a file converted into a picture file format including the unit block picture data or the compressed unit block picture data and indexes of each block, and stores the converted file in the converted file DB.

Preferably, the picture file format includes picture header information having a size of the whole picture and a size of each unit block, and supplementary information having at least one of a thumbnail of the picture, location information of an initial display block, and picture summary text information.

The converted file transmitting unit 776 transmits the converted file directly to the mobile communication terminal 600, so that the mobile communication terminal 600 can receive the format-converted file from the format converting server 770, or transmits the format-converted file to the picture providing server 790, so that the picture providing server 790 can receive the format-converted file from the format converting server 770 and provide the file to the mobile communication terminal 600.

In this embodiment, the format converting server 770 and the picture providing server 790 are individually formed, but the format converting server 770 can be included in the picture providing server 790. Here, the picture providing server 790 includes the converted file DB 778 for storing the picture data format-converted according to specifications of terminals, and appropriately provides the format-converted picture data upon the request of the mobile communication terminal 600.

In addition, the operation of the format converting server 770 can be performed directly in the picture providing server 790, and can also be performed by various servers for wireless internet services, such as the picture providing server 790, the MMSC 750 and wired/wireless gateways. It depends on the wireless internet infrastructure, without being restricted in structure and position here.

In accordance with the present invention, the format converting server 770 converts the general picture data into the suggested file format. However, the file converting server 770 also has the function of re-converting the converted picture data into the general picture data.

The structure of the mobile communication terminal 600 for receiving the picture data format-converted by the format converting server 770 from the format converting server 770, the picture providing server 790 or the MMSC 750, and displaying the picture data will now be described with reference to FIGS. 10 and 11.

Figure 10:
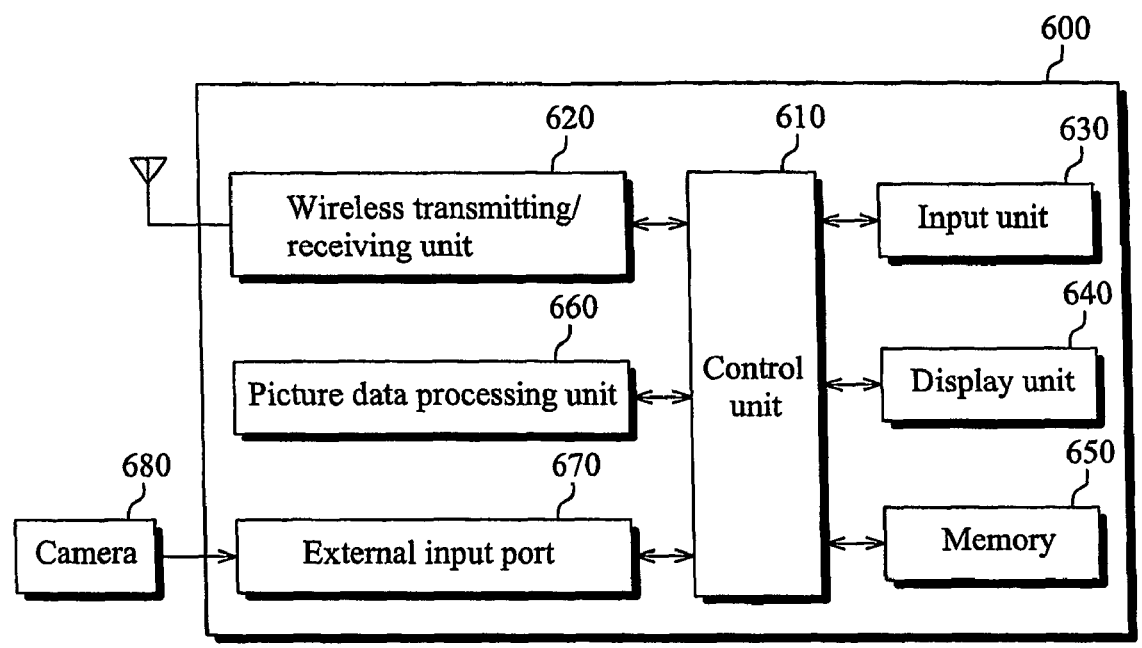
FIG. 10 is a structure diagram illustrating a mobile communication terminal of FIG. 8.
Figure 11:
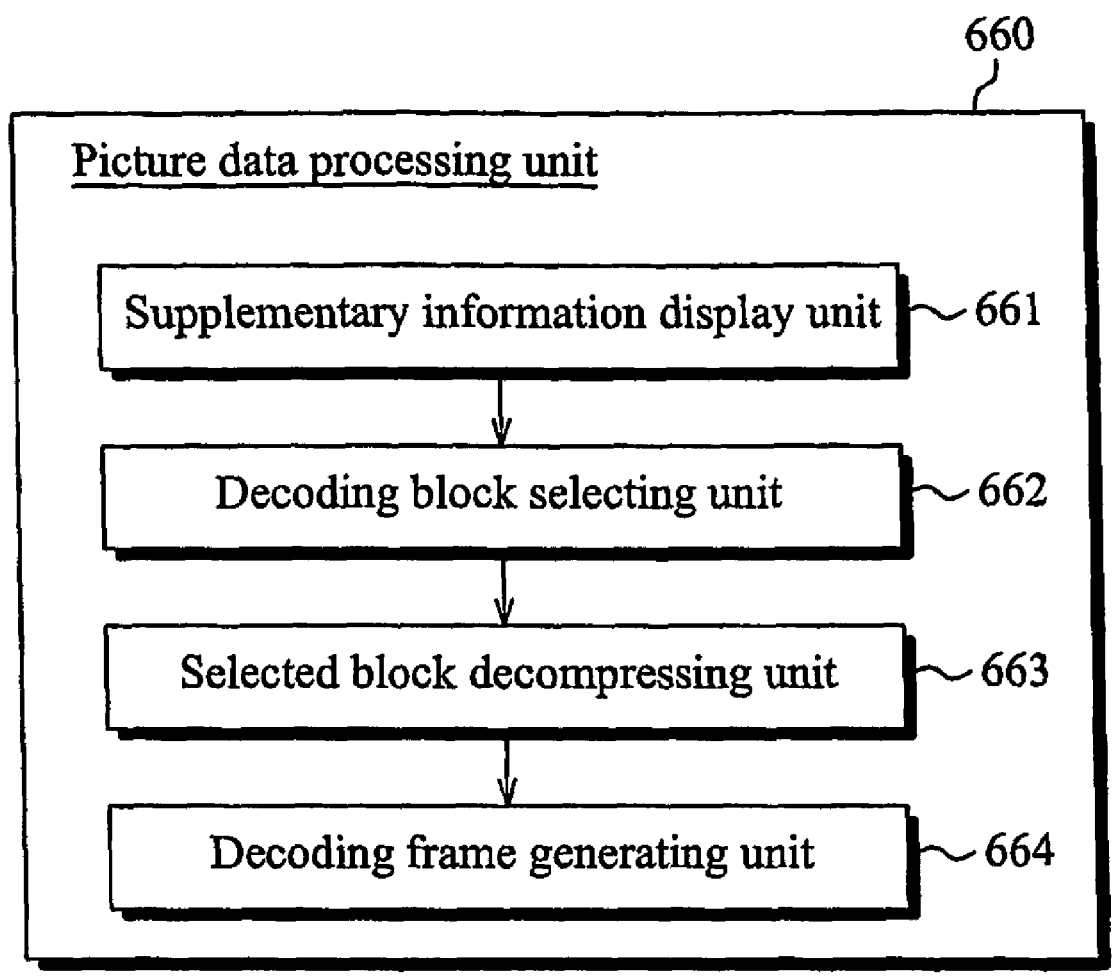
FIG. 11 is a structure diagram illustrating a picture data processing unit of FIG. 10.

FIG. 10 is a structure diagram illustrating the mobile communication terminal of FIG. 8, and FIG. 11 is a structure diagram illustrating a picture data processing unit of FIG. 10.

As illustrated in FIG. 10, the mobile communication terminal 600 in accordance with the second embodiment of the present invention includes a control unit 610 for controlling the whole operations of the terminal 600 and the display of the picture, a wireless transmitting/receiving unit 620 for transmitting and receiving wireless signals, an input unit 630 such as a keypad or touch screen, a display unit 640 for displaying the picture, a memory 650 for storing data, an external input port 670 for receiving picture data from an external device such as a camera 680, and a picture data processing unit 660 for processing a series of processes for displaying the picture data.

The wireless transmitting/receiving unit 620 receives format-converted picture data from the format converting server 770, the picture providing server 790 or the MMSC 750 of the system for converting the picture file format, or transmits picture data to the format converting server 770 for format conversion, and receives a format-converted file from the format converting server 770.

The input unit 630 receives a command from the user, namely a picture display command such as a scroll action command through the keypad or touch screen.

The display unit 640 outputs the picture of the format-converted picture data, and displays the high resolution picture by scrolling.

The memory 650 for storing the picture data includes a screen frame buffer for buffering the picture which will be outputted to the display unit 640 and a decoding frame buffer for buffering each of the unit blocks including the picture which will be outputted to the display unit 640.

The picture data processing unit 660 which is one of the major parts of the invention receives the format-converted picture file from the format converting server 770 or picture providing server 790, extracts minimum unit block picture data composing the partial picture which will be outputted to the display unit 640 by using index information of the converted picture file format, and outputs the corresponding picture.

The mobile communication terminal 600 receives picture data photographed by the camera 680 through the external input port 670, transmits the picture data to the format converting server 770, receives format-converted picture data from the format converting server 770, and displays the picture data through the picture data processing unit 660.

The picture data processing unit 660 will now be described in more detail with reference to FIG. 11.

As shown in FIG. 11, the picture data processing unit 660 has the same constitution as the picture data processing unit 370 of the mobile communication terminal 300 in accordance with the first embodiment of the present invention. The picture data processing unit 660 includes a supplementary information display unit 661, a decoding block selecting unit 662, a selected block decompressing unit 663 and a decoding frame generating unit 664.

The supplementary information display unit 661 extracts supplementary information including at least one of a thumbnail of the picture of the picture file format, location information of an initial display block and picture summary text information from the picture file format, and displays the extracted information on the display unit 640. A time point of displaying the supplementary information is not restricted. However, the supplementary information may be displayed before the picture is displayed, or displayed with the picture.

The decoding block selecting unit 662 selects minimum unit blocks composing the partial picture which will be outputted to the display unit 640, and extracts the selected unit block picture data from the picture file of the memory 650 by using the index information of the converted picture file format.

When the unit block picture data are compressed data, the selected block decompressing unit 663 decompresses the unit block picture data extracted by the decoding block selecting unit 662.

The decoding frame generating unit 664 buffers the picture file of the extracted blocks in the decoding frame buffer, and re-buffers the picture which is included in the blocks buffered in the decoding frame buffer and which will be outputted to the display unit 640 in the screen frame buffer, to display the picture.

The process for converting the picture file format and displaying the picture by the system for converting the picture file format in accordance with the second embodiment of the present invention is divided into a format converting process of the format converting server and a display process of the mobile communication terminal, which will be explained with reference to FIGS. 12 and 13.

Figure 12:
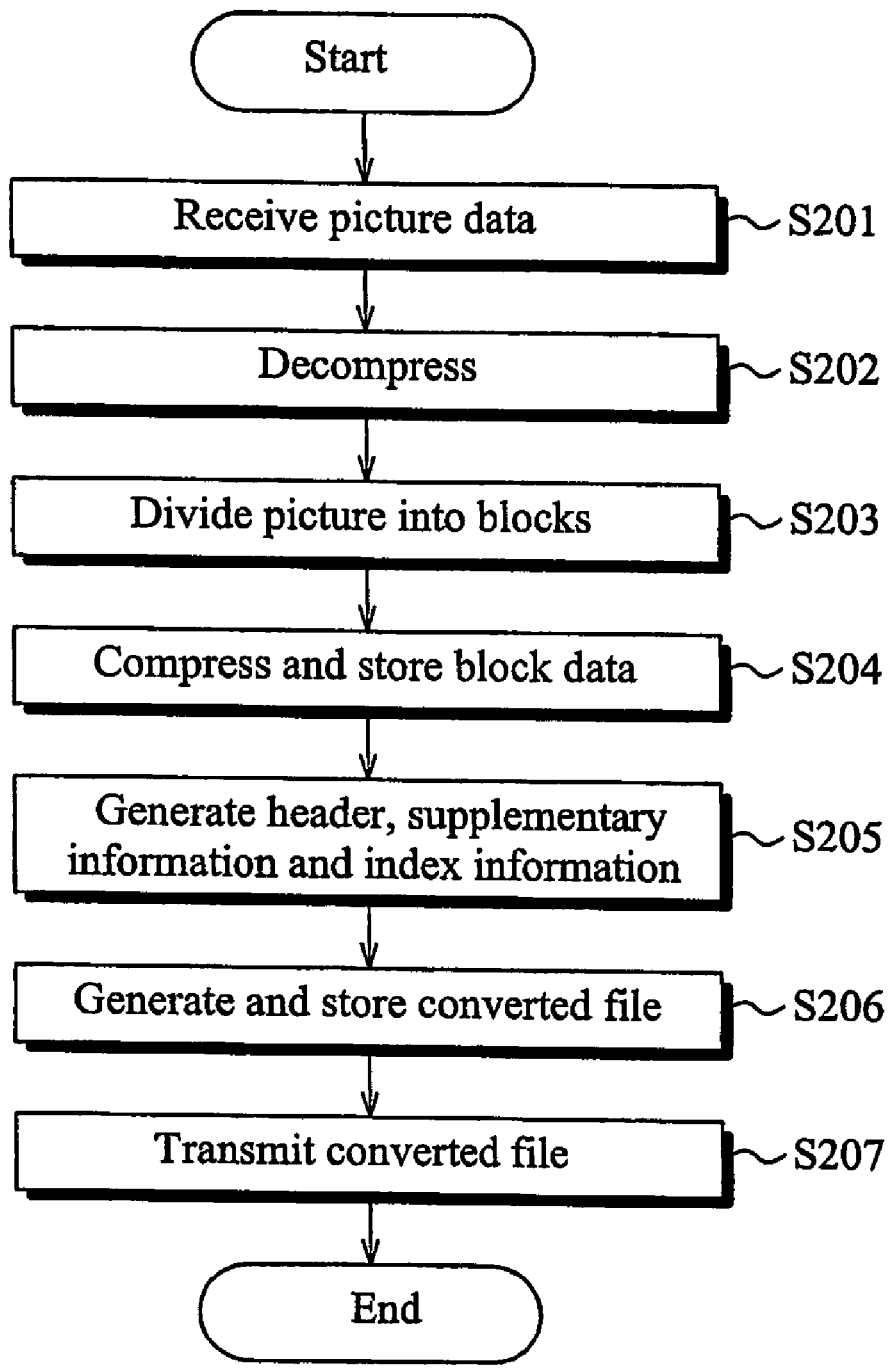
FIG. 12 is a flowchart showing sequential steps of a format converting process of the format converting server in accordance with the second embodiment of the present invention.

FIG. 12 is a flowchart showing sequential steps of the format converting process of the format converting server in accordance with the second embodiment of the present invention.

As depicted in FIG. 12, the format converting server 770 receives picture data from the mobile communication terminal 600 or picture providing server 790 (S201). Here, when the picture data are compressed data, the format converting server 770 decompresses the picture data (S202).

Thereafter, the format converting server 770 divides the picture into a plurality of unit blocks (S203), compresses the unit block picture data, and stores the compressed data (S204). In addition, the format converting server 770 generates index information for access to the plurality of unit block picture data, header information and supplementary information (S205), generates a converted file including the picture data compressed and stored by blocks, indexes, header and supplementary information, and stores the file in the memory (S206).

The format-converted file is transmitted to the mobile communication terminal 600 or picture providing server 790 requesting format conversions (S207), or stored in the converted file DB 778 to be provided later.

Figure 13:
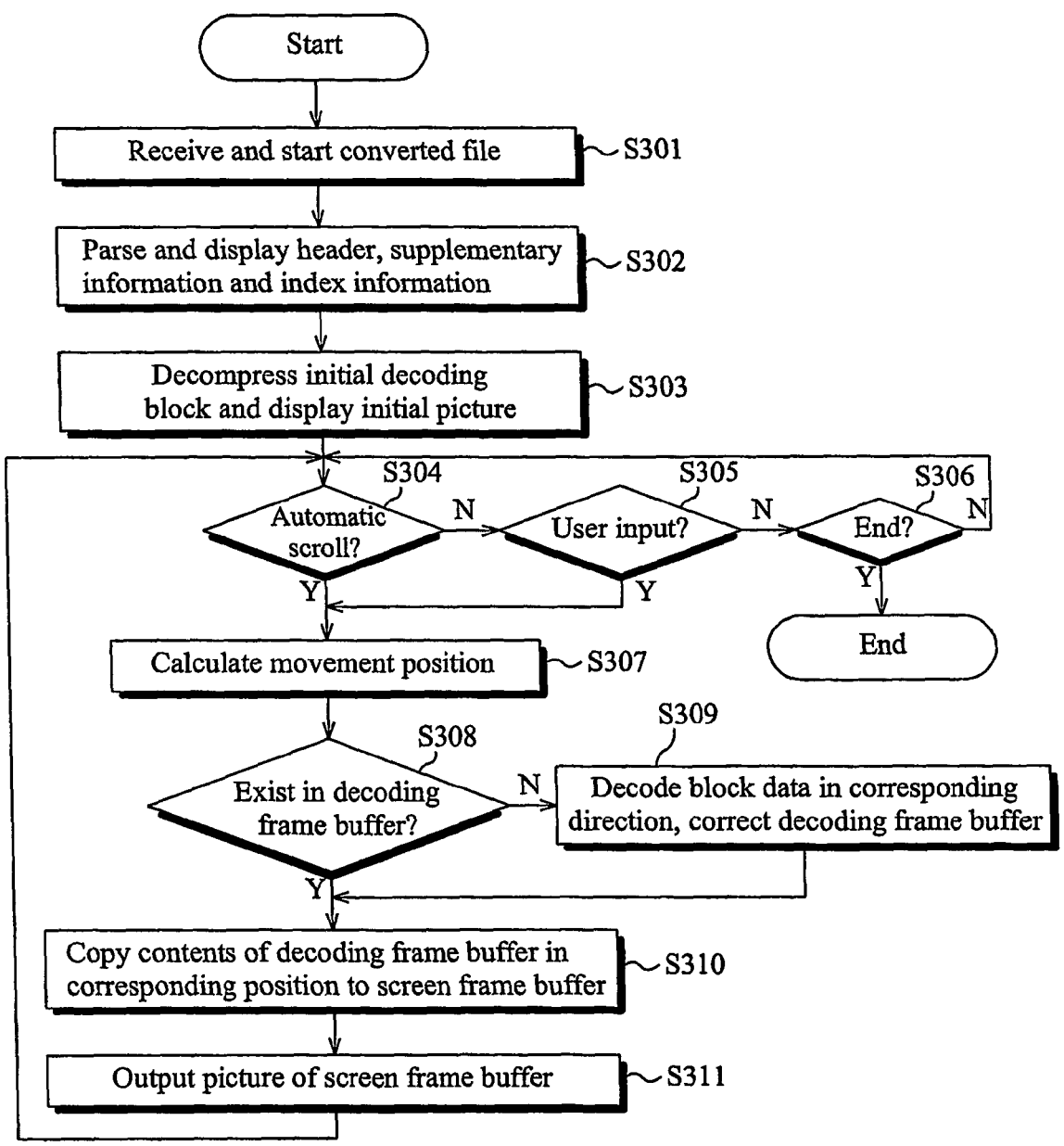
FIG. 13 is a flowchart showing sequential steps of a picture display process of the mobile communication terminal in accordance with the second embodiment of the present invention.

FIG. 13 is a flowchart showing sequential steps of the picture display process of the mobile communication terminal in accordance with the second embodiment of the present invention, especially the display method of the mobile communication terminal receiving the format-converted file after the format converting process of FIG. 12.

As illustrated in FIG. 13, the mobile communication terminal 600 receives the format-converted picture file through the format converting server 770, and stores the picture file in the memory (S301). The picture data processing unit 660 parses the picture header, supplementary information and index information of the converted picture file according to a display command or file information display command, and displays the information on the display unit (S302).

The picture data processing unit 660 reads the minimum unit block picture data composing the partial picture which will be initially outputted to the display unit 640 by using the index information of the picture file format, decompresses the picture data, buffers the decompressed picture data in the decoding frame buffer, and copies the outputted part of the picture buffered in the decoding frame buffer to the screen frame buffer, to outputs the initial picture (S303).

Preferably, the top left end of the picture is set to be initially outputted, and the top left end to the bottom right end of the picture are displayed by the automatic scroll action, so that the user can see the whole picture without inputting any key.

On the other hand, after the initial picture is outputted (S303), if the automatic scroll action is previously set (S304) or the user inputs a picture scroll command (S305), the picture data processing unit 660 calculates movement and display positions of the screen in the whole picture by the scroll action (S307), and decides whether the data which will be buffered in the position-changed screen frame buffer exist in the previous decoding frame buffer, namely whether the block which needs to be additionally decoded exists (S308).

As the decision result, when the data which will be buffered in the moved screen frame buffer partially exist or do not exist in the previous decoding frame buffer (when the block which needs to be additionally decoded exists), the picture data processing unit 660 finds the corresponding block data in the movement direction, decodes the data, and stores the decoded data in the decoding frame buffer, to correct the decoding frame buffer (S309).

Here, when the block which is not included in the moved screen frame buffer exists in the previous decoding frame buffer, the decoding data of the block must be deleted.

If the decoding frame buffer is corrected (S309) or the movement position exists in the previous decoding frame buffer, the picture data processing unit 660 copies the contents of the decoding frame buffer in the position to the screen frame buffer (S310), and outputs the picture of the screen frame buffer through the display unit 640 (S311).

On the other hand, when the automatic scroll action is previously set (S304), if the user inputs command for intercepting the automatic scroll action through keypad, the picture display process is ended (S306). When the picture display process is performed by the scroll action inputted by the user (S305), if the user stops inputting the scroll key, the display process is ended (S306).

In this embodiment, the process for displaying the picture file format in the mobile communication terminal has been explained. However, the present invention can also be applied to various small terminals including display means having lower resolution than the resolution of the picture and small memories.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

Industrial Applicability

As described above, the present invention divides the picture into the plurality of blocks, stores the indexes with the block picture data, and displays the picture in block units in the mobile communication terminal by using the indexes. It is thus possible to display the high resolution picture with a very small memory and throughput in the apparatus which has the low resolution display device and which is not able to display the high resolution picture at a high speed because of its small memory, such as the mobile communication terminal. The whole picture data are not minimized or transformed, and thus not damaged or lost. Moreover, quality of the picture data is maintained, and the user scrolls and outputs the picture in a wanted area.

What is claimed is:

1. A mobile communication terminal configured to display a high resolution picture, comprising:
 a wireless transmitting/receiving unit configured to receive high resolution picture data through a mobile communication network;
 a memory;
 a format converting unit configured to convert the high resolution picture data from the wireless transmitting/receiving unit into picture file formatted data including a plurality of unit blocks of high resolution picture data and indexes for providing access to each block of high resolution picture data, and configured to store the picture file formatted data in the memory, the format converting unit including:
  a picture dividing unit configured to divide the high resolution picture data into the plurality of unit blocks of high resolution picture data; and
  a storing unit configured to generate the indexes for each of the divided unit blocks of the high resolution picture data and to store the file formatted picture including the index information and each unit block of the high resolution picture data based on the index information in the memory;
 a picture data processing unit configured to select, and extract a minimum number of unit blocks using the index information of the picture file formatted data and output a high resolution partial picture of only a portion of the high resolution picture based upon the selected and extracted minimum number of unit blocks, the picture data processing unit including:
  a decoding block selecting unit; and
  a decoding frame generating unit; and
 a display unit configured to display the partial picture,
 wherein a scroll action operates to change a position of the partial picture within the high resolution picture by selecting and extracting only those unit blocks which need to be additionally decoded;
 wherein the size of each unit block of picture data is less than a size of the partial picture; and
 wherein the partial picture has the same resolution as the high resolution picture.

2. The mobile communication terminal of claim 1, wherein the memory further comprises:
 a screen frame buffer configured to buffer the partial picture outputted to the display unit; and
 a decoding frame buffer configured to buffer the unit blocks of picture data including the partial picture outputted to the display unit.

3. The mobile communication terminal of claim 1, wherein the picture data processing unit further comprises a selected block decompressing unit configured to decompress each of the extracted unit blocks of picture data.

4. The mobile communication terminal of claim 1,
 wherein the picture file formatted data comprises picture header information including a size of the whole picture and a size of each unit block of picture data; and
 wherein the picture data processing unit further comprises a supplementary information display unit configured to extract the picture header information from the picture file formatted data and output the information to the display unit.

5. The mobile communication terminal of claim 1,
 wherein the picture file format comprises supplementary information including at least one of a thumbnail of the high resolution picture, location information of an initial display block and picture summary text information; and
 wherein the picture data processing unit further comprises a supplementary information display unit configured to extract the supplementary information from the picture file formatted data and display the supplementary information on the supplementary display unit.

6. The mobile communication terminal of claim 1, wherein the format converting unit further comprises a compressing unit configured to individually compress each of the divided blocks; and
 wherein the storing unit is configured to store the compressed unit blocks of picture data in the memory.

7. The mobile communication terminal of claim 1, wherein the format converting unit further comprises a decompressing unit configured to decompress the compressed picture data from the wireless communication unit.

8. The mobile communication terminal of claim 1, wherein the storing unit is configured to generate a picture header including a size of the whole picture and a size of each unit block, and store the picture header in the memory with each unit block.

9. The mobile communication terminal of claim 1, wherein the storing unit is configured to generate supplementary information including at least one of a thumbnail of the picture, location information of an initial display block and picture summary text information, and store the information in the memory with each unit block.

10. The mobile communication terminal of claim 1, further comprising an external input port configured to receive picture data from an external device;
 wherein the format converting unit is configured to convert the picture data from the external input port into picture file formatted data including a plurality of unit blocks of picture data and indexes for access to each unit block of picture data, and store the picture file format in the memory.

11. The mobile communication terminal of claim 10, wherein the external device is a camera connected to the external input port of the mobile communication terminal.

12. The mobile communication terminal of claim 1, wherein the picture file formatted data comprises picture header information including a size of the whole picture and a size of each unit block of picture data, wherein the size of each unit block of picture data is less than a size of the partial picture, and wherein the minimum number of unit blocks associated with each partial picture is greater than one.

13. A method for outputting a file formatted high resolution picture to a display unit in a mobile communication terminal, the method comprising executing in sequence steps of:
 receiving high resolution picture data through a mobile communications network;
 formatting the received high resolution picture data by dividing the received high resolution picture data into picture file formatted data including a plurality of unit blocks of the high resolution picture data and index information;

extracting a minimum number of unit blocks of the high resolution picture data from the picture file formatted data;

generating a high resolution partial picture that includes only a portion of the high resolution picture using the extracted minimum number of unit blocks and the index information, wherein the partial picture corresponds to a display area of the mobile communications terminal; and outputting the partial picture to the display unit; and extracting corresponding unit blocks of picture data as required from the picture file formatted data in a movement direction by using the index information and outputting a position-moved picture based on a scroll action generated during the display of the picture, wherein the size of each unit block of the high resolution picture data is less than a size of the high resolution partial picture, and wherein the minimum number of unit blocks associated with each high resolution partial picture is greater than one; and wherein the high resolution partial picture has the same resolution as the high resolution picture.

14. The method of claim 13, wherein the picture file formatted data comprises picture header information including a size of the whole picture and a size of each unit block of picture data, the method further comprising extracting the picture header information of the picture file formatted data and displaying the picture header information on the picture header display unit.

15. The method of claim 13, wherein the picture file formatted data comprises supplementary information including at least one of a thumbnail of the picture, location information of an initial display block and picture summary text information, the method further comprising extracting the supplementary information of the picture file formatted data and display the supplementary information on the supplementary display unit.

16. The method of claim 13, wherein the memory comprises a screen frame buffer configured to buffer the partial picture outputted to the display unit, and a decoding frame buffer configured to buffer each unit block of picture data outputted to the display unit, and the method further comprising:

selecting a minimum number of unit blocks of picture data necessary to generate a partial picture outputted to the display unit, and extracting the selected unit blocks of picture data from the picture file formatted data using the index information of the associated unit blocks;

buffering the extracted unit blocks of picture data in the decoding frame buffer; and outputting the partial picture in the screen frame buffer to the display unit.

17. The method of claim 16, further comprising decompressing each of the extracted unit blocks of picture data after extracting the unit block picture data and before buffering the picture data of the extracted unit blocks in the decoding frame buffer.

18. The method of claim 13, wherein the memory comprises a screen frame buffer configured to buffer the partial picture outputted to the display unit, and a decoding frame buffer configured to buffer each unit block of picture data outputted to the display unit, and wherein outputting the moved picture comprises:

calculating a movement position based on a scroll action executed during the display of the partial picture;

re-selecting the minimum unit blocks of picture data of the partial picture outputted to the display unit in the movement direction, and determining whether the selected unit blocks of picture data exist in the decoding frame buffer; and buffering the contents of the decoded frame buffer in the corresponding movement position of the screen frame buffer and displaying the partial picture based a determination that the re-selected unit blocks of picture data exist in the decoding frame buffer.

19. The method of claim 18, further comprising:

prior to displaying the partial picture, extracting the unit blocks of picture data from the picture file formatted data in the corresponding movement direction using index information when the re-selected unit blocks of picture data do not exist in the decoding frame buffer;

buffering the picture file of the extracted blocks in the decoding frame buffer; and correcting the decoding frame buffer.

20. The method of claim 19, further comprising decompressing each of the extracted unit blocks of picture data, after extracting the selected unit block picture data and before correcting the decoding frame buffer.

21. The method of claim 13, further comprising:

dividing the picture data from the wireless communication unit into a plurality of unit blocks of picture data;

converting the unit blocks of picture data into picture file formatted data with indexes providing access to each unit block of picture data; and storing the picture file formatted data in the memory before outputting the partial picture.

22. The method of claim 21, further comprising:

dividing the picture data from the wireless transmitting/receiving unit into a plurality of unit blocks of picture data;

generating indexes for each of the divided unit blocks of picture data; and generating a converted file according to the picture file formatted data based on the index information.

23. The method of claim 22, further comprising compressing each of the divided plurality of unit blocks of picture data by blocks, after dividing the picture data into the plurality of unit blocks.

24. The method of claim 22, further comprising:

generating a picture header including a size of the whole picture and a size of each unit block after dividing the picture data into the plurality of unit blocks and before generating the converted file;

wherein generating the converted file generates the converted file including the picture header.

25. The method of claim 22, further comprising generating supplementary information including at least one of a thumbnail of the picture, location information of an initial display block and picture summary text information after dividing the picture data into the plurality of unit blocks and before generating the converted file;

wherein generating the converted file generates the converted file including the supplementary information.

26. A system configured to display picture data in a mobile communication system, the mobile communication system comprising:

a mobile communication terminal including a display device;

a base transceiver system configured to perform wireless area communication with the mobile communication terminal;

a base station controller configured to control the base transceiver system;

a packet data service node connected to the base station controller, the packet data service node configured to provide data services to the mobile communication terminal; and a picture providing server configured to provide picture data to the mobile communication terminal through the packet data service node;

wherein the format converting server includes:

a received file database configured to store high resolution picture data from at least one of the mobile communication terminal and the picture providing server, and a converted file database configured to store a format-converted file of the picture data;

a picture data receiving unit configured to receive the high resolution picture data from the picture providing server;

a picture dividing unit configured to divide the high resolution picture data of the picture data into a plurality of unit blocks of the high resolution picture data received from at least one of the mobile communication terminal and the picture providing server;

a storing unit configured to generate indexes of each of the divided unit blocks, the storing unit further configured to generate a file converted into a picture file format including the picture data and indexes of each unit block, and further configured to store the converted file in the converted file database; and a converted file transmitting unit configured to transmit the converted file to the mobile communication terminal or picture providing server, wherein a size of each unit block of picture data is less than a size of a display size of the mobile communications terminal, and the display size of the mobile communications terminal is configured to display only a portion of the high resolution picture data; and wherein the portion of the high resolution picture data has the same resolution as the high resolution picture data.

27. The system of claim 26, wherein the storing unit is configured to generate a picture header including a size of the whole picture and a size of each unit block of picture data, and to store the converted file, including the picture header.

28. The system of claim 26, wherein the storing unit is configured to generate supplementary information including at least one of a thumbnail of the picture, location information of an initial display block and picture summary text information, and the converted file, including the supplementary information.

29. The system of claim 26, wherein the format converting server further comprises a compressing unit configured to individually compress each of the divided blocks, and the storing unit is configured to store the converted file, including the compressed unit blocks of picture data in the converted file database.

30. The system of claim 26, wherein the format converting server further comprises a decompressing unit configured to decompress compressed picture data from the mobile communication terminal or picture providing server.

31. A method of displaying a high resolution picture in a mobile communication terminal having a display device configured to display, at any one time, only a portion of a high resolution picture data, the method comprising the sequentially executed steps of:

dividing, at a format converting server, the high resolution picture data received from the mobile communication terminal or from a picture providing server, into a plurality of unit blocks of the high resolution picture data;

generating indexes that provide access to each divided unit block of the high resolution picture data;

generating a file converted into picture file format, including the index information and each of the unit blocks; and transmitting the converted file including all unit blocks and index information to the mobile communications terminal over a mobile communications system;

wherein a size of each unit block of the high resolution picture data is less than a size of a display size of the mobile communications terminal; and wherein the portion of the high resolution picture data has the same resolution as the high resolution picture data.

32. The method of claim 31, further comprising, compressing each of the divided unit blocks of picture data, after dividing the picture data into the plurality of unit blocks.

33. The method of claim 31, further comprising, generating a picture header including a size of the whole picture and a size of each unit block, after dividing the picture data into the plurality of unit blocks and before generating the converted picture file;

wherein generating the converted picture file generates a converted picture file of formatted picture data including the picture header.

34. The method of claim 31, further comprising, generating supplementary information including at least one of a thumbnail of the picture, location information of an initial display block and picture summary text information, after dividing the picture data into the plurality of unit blocks and before generating the converted file, wherein generating the converted file generates a converted file including the supplementary information.

* * * * *